United States Patent [19]

Kurita et al.

[11] Patent Number: 4,908,395

[45] Date of Patent: Mar. 13, 1990

[54] PHOTOCURABLE ADHESIVE COMPOSITION FOR GLASS

[75] Inventors: Atsushi Kurita; Masayuki Hatanaka, both of Gunma; Sam Huy, Tokyo, all of Japan

[73] Assignee: Toshiba Silicone Co., Ltd., Tokyo, Japan

[21] Appl. No.: 185,661

[22] Filed: Apr. 25, 1988

[30] Foreign Application Priority Data

Apr. 23, 1987 [JP] Japan ................ 62-100750

[51] Int. Cl.$^4$ ............... C08F 283/12; C08G 77/04
[52] U.S. Cl. ...................... 522/42; 522/99; 525/479; 528/28
[58] Field of Search ............ 522/42, 99; 525/479; 528/28

[56] References Cited

U.S. PATENT DOCUMENTS

| | | | |
|---|---|---|---|
| 3,932,555 | 1/1976 | Goodrich et al. | 525/479 |
| 4,526,920 | 8/1983 | Sakashita et al. | 524/840 |
| 4,591,608 | 5/1986 | Okinoshima | 522/99 |

FOREIGN PATENT DOCUMENTS 125123 9/1980 Japan .
109852 7/1982 Japan .

Primary Examiner—John C. Bleutge
Assistant Examiner—Susan Berman
Attorney, Agent, or Firm—Sughrue, Mion, Zinn, MacPeak & Seas

[57] ABSTRACT

A photocurable adhesive composition for glass is disclosed, comprising (A) 100 parts by weight of a polyorganosiloxane having an average compositional formula:

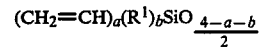

$$(CH_2=CH)_a(R^1)_b SiO_{\frac{4-a-b}{2}}$$

wherein $R^1$ represents a substituted or unsubstituted monovalent hydrocarbon group except for a vinyl group; $0 < a \leq 1$; $0 < b \leq 2$; and $1 < a+b < 3$, (B) from 0.1 to 10 parts by weight of an aromatic ketone photo reaction initiator, and (c) from 0.1 to 5 parts by weight of a trialkenyl isocyanurate or a derivative thereof. The composition, when applied between glass plates or between a glass plate and other materials, can be cured with a small curing shrinkage by short-term irradiation of light transmitted by the glass plate. The cured composition exhibits satisfactory adhesion and excellent resistance to moisture and heat.

8 Claims, No Drawings

PHOTOCURABLE ADHESIVE COMPOSITION FOR GLASS

FIELD OF THE INVENTION

This invention relates to a novel photocurable adhesive composition for glass, and more particularly to a photocurable adhesive composition for glass which is applied between two glass materials or between a glass material and other material and can be sufficiently cured by light of an ultraviolet lamp, a fluorescent lamp, etc., having been transmitted by the glass material.

BACKGROUND OF THE INVENTION

Adhesion between glass and glass has hitherto been effected with a photocurable organic adhesive. The organic adhesive is easy to cure and is highly transparent but, in turn, insufficient in moisture resistance or heat resistance and undergoes large shrinkage on curing. Therefore, the conventional organic adhesive is lacking in adhesion reliability under high temperature and high humidity conditions.

On the other hand, cold curing liquid silicone rubbers are known as adhesive for glass. Since the adhesives of this type are cured through condensation reaction, it takes much time for them to cure when applied on a wide area, which has limited the range of their application. In order to solve this problem, a heat curing liquid silicone rubber which is cured taking advantage of addition reaction has been developed. However, this type of adhesive cannot be heated at a high temperature enough for curing if applied on parts of electronic equipments. Further, it is liable to have cracks in heat cycle testing. From these considerations as well as from the standpoint of energy saving, range of application of the heat curing silicone rubber is thus limited. It has been, therefore, keenly demanded to develop a photocurable silicone rubber adhesive.

There are several reports in the literature about photocurable silicone compositions. For example, U.S. Pat. No. 3,726,710 describes that a vinyl-containing polyorganosiloxane having incorporated therein a photo reaction initiator is curable on irradiation with highly intense ultraviolet rays. However, the composition disclosed is for use in the production of silicone release paper and fit for curing of a thin film but is of no use as adhesive for glass because it exhibits no adhesiveness to glass and considerably reduced curability with light transmitted by glass.

U.S. Pat. No. 3,816,282 discloses a composition comprising a mercapto-containing polyorganosiloxane, polymethylvinylsiloxane, and an organic peroxide of various kinds. This composition has a serious disadvantage of poor preservation stability at room temperature, readily undergoing gelation.

Japanese Patent Application (OPI) NO. 125123/80 (the term "OPI" as used herein refers to a "published unexamined Japanese patent application") describes a composition comprising a vinyl-containing polyorganosiloxane; a polyorganohydrogenosiloxane, and a photosensitizer, and Japanese Patent Application (OPI) No. 109852/82 describes a composition comprising a vinyl-containing polyorganosiloxane and an organic peroxide. Both of these compositions suffer from shortage of adhesion to glass and curability with light transmitted by glass and cannot be, therefore, used as an adhesive for glass.

Apart from these photocurable silicone compositions, Japanese Patent Publication No. 44778/80 proposes a self-bonding heat curable silicone rubber composition comprising an polyorganosiloxane having a viscosity of at least 100,000 cP at 25° C., an organic peroxide as a curing catalyst, and an isocyanurate derivative. The composition involves the similar problems as associated with the aforesaid heat curing liquid silicone rubber, as it cures and adheres on heating. In addition, the high viscosity of the polyorganosiloxane permits of no use as an adhesive.

Thus, there has not yet been developed a satisfactory adhesive for glass which would meet the requirements of heat resistance, moisture resistance, and rapid curability for use, for example, in optical parts of electronic equipments.

SUMMARY OF THE INVENTION

In the light of the above-described circumstances, an object of this invention is to provide a photocurable adhesive composition for glass which can be cured on short-term irradiation of light transmitted by glass to have satisfactory adhesion with a small cure shrinkage and exhibits excellent resistance to moisture and heat.

As a result of extensive investigations, it has now been found that when a composition of a vinyl-containing polyorganosiloxane having incorporated therein an aromatic ketone photo reaction initiator and a trialkenyl isocyanurate is applied between glass plates or between a glass plate and a plate made of other materials, such as plastics, metals, ceramics, etc., and irradiated with light from an ultraviolet ray-emitting lamp from the upper side of the glass plate, it can be cured without undergoing shrinkage to form a glass laminate, in which the adhesive joint has improved resistance to moisture and heat owing to the silicone to thereby assure reliability of the laminate.

The present invention relates to a photocurable adhesive composition for glass, comprising (A) 100 parts by weight of a polyorganosiloxane having an average compositional formula:

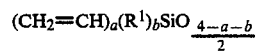

$$(CH_2=CH)_a(R^1)_b SiO_{\frac{4-a-b}{2}}$$

wherein $R^1$ represents a substituted or unsubstituted monovalent hydrocarbon group except for a vinyl group; $0 < a \leq 1$; $0 < b \leq 2$; and $1 < a+b < 3$, (B) from 0.1 to 10 parts by weight of an aromatic ketone photo reaction initiator, and (C) from 0.1 to 5 parts by weight of a trialkenyl isocyanurate or a derivative thereof.

DETAILED DESCRIPTION OF THE INVENTION

The polyorganosiloxane as component (A) is a compound generally used as a starting material for liquid silicone rubber composition. In the above-described formula, specific examples of the substituted or unsubstituted monovalent hydrocarbon group other than a vinyl group include alkyl groups, e.g., methyl, ethyl, propyl, butyl, isobutyl, amyl, hexyl, octyl and decyl groups, etc.; alkenyl groups, e.g., allyl, cyclohexenyl and 3-cyclohexenylethyl groups, etc.; cycloalkyl groups, e.g., cyclopentyl and cyclohexyl groups, etc.; aryl groups, e.g., phenyl and tolyl groups, etc.; aralkyl groups, e.g., 2-phenylethyl and 2-phenylpropyl groups, etc.; and substituted hydrocarbon groups, e.g., chloromethyl, chlorophenyl and 3,3,3-trifluoropropyl groups, etc. From the viewpoint of ease in synthesis and heat resistance, it is preferable that all the groups represented by $R^1$ comprise a methyl group or a combination of a methyl group and a phenyl group. In the latter case, 40% or less of the groups comprise phenyl groups, with the remainder being methyl groups. If the phenyl group proportion exceeds 40%, the cured composition tends to yellow or the composition tends to fail to sufficiently cure. Further, such a polyorganosiloxane is disadvantageous from the standpoint of synthesis as well as economy. In the above-described formula, b for $R^1$ is a number more than 0 and up to (and including) 2.

The vinyl group in the component (A) takes part in crosslinking reaction of the composition of the present invention. In the formula, a for the vinyl group is a number more than 0 and up to (and including) 1. If a is too small, i.e., the amount of the vinyl group is too small, curing would be insufficient. On the other hand, if it is too large, the polyorganosiloxane after curing has a reduced strength or a deteriorated heat resistance, and also it is difficult to synthesize such a polyorganosiloxane Accordingly, the amount of the vinyl group in the component (A) preferably ranges from 1 to 50% based on the total organic group (a+b).

The polyorganosiloxane as the component (A) preferably has a viscosity falling within a range of from 100 to 100,000 cP, and more preferably from 200 to 50,000 cP, at 25° C. Viscosities less than 100 cP causes reduction in strength of a cured adhesive joint or rate of curing. Viscosities exceeding 100,000 cP deteriorate fluidity or workability of the composition as adhesive. The polyorganosiloxane which can be used in this invention desirably has a substantially linear structure from the standpoint of fluidity and workability. Therefore, the amount of the total organic group (a+b), while being selected from the range 1<a+b<3, preferably ranges from 1.98 to 2.02 in practice. An oily polyorganosiloxane partially containing a branched structure may also be used without any problem as long as such does not interfere with practice of the present invention.

The aromatic ketone photo reaction initiator as component (B) makes it the chief aim to induce photocuring of the component (A). Examples of the component (B) include acetophenones, e.g., acetophenone, 2,2-dimethoxyacetophenone, 2,2-diethoxyacetophenone, p-t-butyltrichloroacetophenone, etc.; propiophenones, e.g., 2-hydroxy-2-methyl-propiophenone, 4'-isopropyl-2-hydroxy-2-methyl-propiophenone, etc.; benzoins, e.g., benzoin, benzoin isopropyl ether, benzoin phenyl ether, etc.; benzophenone and its derivatives; benzyl dimethyl ketone and its derivatives; and the like. These compounds may be used either individually or in combinations of two or more thereof. Of these photo reaction initiators, acetophenones and propiophenones are particularly preferred in view of compatibility with the component (A) and curing properties.

The component (B) is used in an amount of from 0.1 to 10 parts, and preferably from 0.3 to 5 parts, by weight per 100 parts by weight of the component (A). If the amount of the component (B) is less than 0.1 part by weight, the resulting composition takes longer time for curing, lacking in practicability. Even if it exceeds 10 parts by weight, no further effects can be attained any more and, rather, the compatibility with the component (A) would be deteriorated.

The trialkenyl isocyanurate as component (C) is an additive for improving adhesion to glass without interfering with the crosslinking reaction of the composition. Specific examples of the component (C) are triallyl isocyanurate, tributenyl isocyanurate, trivinyl isocyanurate, tricyclohexenyl isocyanurate, trimethoxysilylpropyldiallyl isocyanurate, bis(trimethoxysilylpropyl)allyl isocyanurate, triethoxysilylpropyldiallyl isocyanurate, etc. The trimethoxysilylpropyldiallyl isocyanurate can be obtained easily by reacting triallyl isocyanurate with an equimole of trimethoxysilane in the presence of a platinum catalyst. The most preferred of the above-enumerated compounds is triallyl isocyanurate because of the best commercial availability and its excellent effects.

These trialkenyl isocyanurates may be used either individually or in combinations of two or more thereof. The amount to be used ranges from 0.1 to 5 parts, and preferably from 0.2 to 3 parts, by weight per 100 parts by weight of the component (A). If it is less than 0.1 part by weight, sufficient adhesion to glass cannot be assured. If it exceeds 5 parts by weight, curing properties are deteriorated.

The photocurable adhesive composition according to the present invention may further contain, in addition to the components (A) to (C), additives improving heat resistance agents, silica-based fillers, dyes, and other conventional modifiers as far as they do not impair the effects of the present invention.

A light source for curing the composition of the present invention includes known lamps emitting ultraviolet radiation, such as a high-pressure mercury lamp, a low-pressure mercury lamp, a xenon lamp, a mercury/metal halide lamp, a fluorescent lamp, a carbon-arc lamp, etc.

The photocurable adhesive composition according to the present invention can be applied between two glass plates or between a glass plate and other material and cured at low temperatures in short periods of time merely by irradiating ultraviolet light which is emitted from an ultraviolet light source and transmitted by the glass plate to thereby join the adherents firmly. Therefore, the composition is very useful as an adhesive for glass. Moreover, since the composition undergoes virtually no curing shrinkage, the internal force imposed on glass in the resulting laminate is smaller than that produced by the conventional acrylic adhesives. As a result, the fear of peel can be eliminated, and reliability of the adhesive joint is so much enhanced. In addition, use of the polyorganosiloxane as main component brings about marked improvements on heat resistance, moisture resistance, weather resistance, and the like, thus broadening the range of application.

Thus, the photocurable adhesive composition for glass according to the present invention is suitable not only as adhesive for glass materials but for sealing of liquid crystals, fixation of cover glass for electronic equipments, such as light-emitting elements.

The present invention is now illustrated in greater detail with reference to Examples and Comparative Examples, but it should be understood that the present invention is not limited thereto. In these examples, all the parts are by weight unless otherwise indicated.

EXAMPLE 1

To 100 parts of polydimethylsiloxane terminated with a trimethylsiloxy group at both ends thereof containing 10 mol % of a methylvinylsiloxy unit and having a viscosity of 3,000 cP at 25° C. were added 2 parts of 2-hydroxy-2-methyl-propiophenone and 0.5 part of triallyl isocyanurate, and the mixture was uniformly mixed to prepare a clear adhesive composition.

A 0.5 g portion of the adhesive composition was placed on a glass plate (50 mm×50 mm×1 mm), and another glass plate (cover glass) of the same size was superposed thereon taking care not to form bubbles in the adhesive layer, and pressure was applied thereto while adjusting the thickness of the adhesive layer at 0.1 mm by using a spacer to thereby form a uniform adhesive layer. The glass laminate was then irradiated with light emitted from a 4 kW high-pressure mercury lamp placed above the cover glass at a distance of 100 mm for 10 seconds, whereby the adhesive layer completely cured to make it difficult to separate the glass plates from each other.

The resulting glass laminate was subjected to heat cycle test by maintaining it at −40° C. for 20 minutes and then at 80° C. for 20 minutes and repeating the heat cycle 10 times. As a result, no cracking was observed.

In order to determine tensile shear strength of the adhesive composition, a test specimen was prepared in accordance with JIS K6850 "Test Method for Tensile Shear Strength of Adhesive" by laminating 1 mm thick glass plates of a prescribed size with a 0.1 mm thick adhesive composition layer being interposed therebetween and irradiating the laminate with ultraviolet light under the same conditions as described above. The glass laminate was reinforced by a plastic cover not to be broken and tested at 25° C. according to JIS K6850. As a result, the adhesive strength was 3.1 kgf/cm$^2$ and the cohesive failure rate was 100%.

In order to evaluate moisture resistance, the same test of tensile shear strength was carried out on the same specimen but after having been allowed to stand at 85° C. and 95% RH for 1,000 hours. The tensile shear strength was 3.0 kgf/cm$^2$, and the cohesive failure rate was 100%. Further, no significant clouding of the adhesive layer due to water absorption was observed.

In order to evaluate heat resistance, the same test was repeated on the same specimen but after having been heated at 150° C., 200° C. or 250° C. for 1 hour each in an oven. As a result, the sample had a tensile shear strength of 3.2 kgf/cm$^2$, 3.4 kgf/cm$^2$, or 3.0 kgf/cm$^2$, respectively, and a cohesive failure rate of 100%.

EXAMPLE 2

To 100 parts of polydimethylsiloxane terminated with a dimethylvinylsiloxy group at both ends thereof containing 5 mol% of a methylvinylsiloxy group and having a viscosity of 20,000 cP at 25° C. were added 3 parts of 4'-isopropyl-2-hydroxy-2-methyl-propiophenone and 1 part of triallyl isocyanurate, followed by uniformly mixing to prepare a clear adhesive composition.

A 20 g portion of the adhesive composition was interposed between two glass plates (300 mm×600 mm×1 mm) to form an adhesive layer having a thickness adjusted to 0.2 mm by using a spacer. The laminate was irradiated with light emitted from five fluorescent lamps ("FL20S-BLB" manufactured by Toshiba Co., Ltd.) aligned in parallel and placed at a distance of 50 mm above the laminate for 30 minutes to cure the adhesive layer.

The resulting glass laminate was cut up into squares of 100 mm×100 mm, and each cut piece was examined for curing properties and adhesiveness of the adhesive joint. As a result, the adhesive joint of every piece was found to have homogeneously cured, and the glass plates could not be separated without involving cohesive failure.

A test specimen for evaluation of tensile shear strength was prepared using the above obtained adhesive composition in the same manner as in Example 1 and tested according to JIS K6850. As a result, the specimen had a tensile shear strength of 1.5 kgf/cm$^2$ and a cohesive failure rate of 100%. When the same specimen was subjected to test of moisture resistance in the same manner as in Example 1, the retentions of adhesive strength and cohesive failure rate were 90% or more based on the initial values before the moisture resistance testing.

EXAMPLE 3

To 100 parts of a polydiorganosiloxane terminated with a trimethylsiloxy group at both ends thereof comprising 30 mol% of a methylvinylsiloxy unit, 5 mol % of a diphenylsiloxy unit, and a dimethylsiloxy unit for the rest and having a viscosity of 1,000 cP at 25° C., 2 parts of 2,2-diethoxyacetophenone and 0.5 part of triallyl isocyanurate were added, followed by uniformly mixing to prepare a clear adhesive composition.

Glass laminates were prepared in the same manner as in Example 1, except for using the above prepared adhesive composition, and the same tests as carried out in Example 1 were conducted. As a result, no cracking was observed in the heat cycle test on the 50 mm-square glass laminate. The tensile shear strength and cohesive failure rate as determined according to JIS K6850 were 3.8 kgf/cm$^2$ and 100%, respectively. Those in the moisture resistant test (85° C., 95% RH, 1,000 hours) were found to be 3.8 kgf/cm$^2$ and 100%, respectively. Further, the retention of tensile shear strength was 90% with a cohesive failure rate of 100% in the heat resistance test at 150° C., 200° C. or 250° C.

EXAMPLE 4

To 100 parts of the sample polydiorganosiloxane as used in Example 1 were added 3 parts of 2,2-dimethoxyacetophenone and 1 part of 3-trimethoxysilylpropyldiallyl isocyanurate, followed by uniformly mixing to prepare an adhesive composition.

Test specimens were prepared in the same manner as in Example 1, except for using the above prepared adhesive composition. When they were tested under the same conditions as in Example 1, substantially the same results as obtained in Example 1 were obtained.

COMPARATIVE EXAMPLE 1

Glass laminates (50 mm×50 mm) were prepared in the same manner as in Example 1, except for using Photobond 100 (a trade name of an organic type UV-curing adhesive produced by Sun Rise Meisei Co., Ltd.) in place of the adhesive composition of the present invention. The adhesive layer was cured to form a firm joint upon irradiation with ultraviolet light in the same manner as in Example 1.

When the resulting specimen was subjected to heat cycle test under the same conditions as in Example 1, it generated cracks in the adhesive layer when cooled to −40° C. When the same specimen as used for the heat cycle test was subjected to moisture resistance test at 85° C. and 95% RH for 1,000 hours, whitening due to moisture absorption was observed in the adhesive layer, and the glass plates could easily be separated with hands. Further, the same specimen as used for the heat cycle test was heated at 150° C. for 1 hour, the adhesive layer yellowed and generated cracks.

COMPARATIVE EXAMPLE 2

To 100 parts of the same polydimethylsiloxane as used in Example 2 were added 1 part of 2,5-dimethyl-2,5-di-t-butylperoxy-hexane and 1.0 part of triallyl isocyanurate, followed by uniformly mixing to prepare a clear adhesive composition.

Glass laminates (50 mm×50 mm) were prepared by using the above prepared adhesive composition in the same manner as in Example 1. When light from a high-pressure mercury lamp placed above the laminate at a distance of 100 mm was irradiated on the laminate for 10 seconds, the adhesive layer was not cured at all. On continuing the irradiation for a total period of 1 minute, the adhesive layer was cured by the heat from the lamp. When the thus cured specimen was subjected to heat cycle test in the manner as in Example 1, cracks generated in the first cycle, proving very poor in adhesion reliability.

COMPARATIVE EXAMPLE 3

To 100 parts of polydimethylsiloxane terminated by a dimethylvinylsiloxy group at both ends thereof having a viscosity of 10,000 cP at 25° C. were added 1.5 parts of a polyorganohydrogenosiloxane comprising a $(CH_3)_2HSiO$ unit and an $SiO_2$ unit, containing 1.0% by weight of a hydrogen atom bonded to the silicon atom, and having a viscosity of 20 cP at 25° C., an isopropyl alcohol solution of chloroplatinic acid in an amount of 10 ppm on platinum conversion, and 1 part of trimethoxysilylpropyldiallyl isocyanurate. The mixture was uniformly mixed to prepare an addition type silicone adhesive composition.

A glass laminate (50 mm×50 mm) was prepared by using the above obtained adhesive composition in the same manner as in Example 1, and the laminate was heated at 150° C. for 30 minutes in an oven to cure the adhesive layer. The resulting specimen was subjected to heat cycle test under the same conditions as in Example 1. As a result, cracks generated during the third cycle, proving lacking in adhesion reliability.

EXAMPLE 5

A 0.5 g portion of the adhesive composition as prepared in Example 1 was placed on each of an acryl resin plate, a polycarbonate plate, a polybutylene terephthalate plate, an iron plate, a stainless steel plate, an aluminum plate, and an alumina plate, each having a size of 50 mm×50 mm×1 mm. A 1 mm thick glass plate was superposed thereon in the same manner as in Example 1. Pressure was applied thereto while adjusting the thickness of the adhesive layer at 0.1 mm to prepare a laminate. The laminate was irradiated with light of the same fluorescent lamps as used in Example 2 placed above the glass plate at a distance of 25 mm for 8 minutes.

The curing properties and adhesiveness of the thus cured adhesive layer were judged by whether the laminate could be separated apart with hands. As a result, each of the laminates showed strong adhesion, and none of them could be separated apart.

On the other hand, each of the uncured laminates composed of a glass plate and a plastic plate was irradiated with light in the same manner as described above but from the side of the plastic plate. The adhesive layer of the laminate using the acryl resin plate was cured by irradiation for 1 hour, but that of the other laminates was not cured. Further, a laminate was prepared in the same manner as for the glass-polybutylene terephthalate laminate, except for changing the thickness of the polybutylene terephthalate plate to 100 μm. On light irradiation, this laminate was cured in 15 minutes to provide a firmly adhered laminate.

As is apparent from the results of the foregoing Examples and Comparative Examples, it can be seen that the photocurable adhesive composition for glass in accordance with the present invention is excellent in curing properties, adhesion, and resistance to moisture and heat.

While the invention has been described in detail and with reference to specific embodiments thereof, it will be apparent to one skilled in the art that various changes and modifications can be made therein without departing from the spirit and scope thereof.

What is claimed is:

1. A photocurable adhesive composition for glass, consisting essentially of (A) 100 parts by weight of a polyorganosiloxane having an average compositional formula:

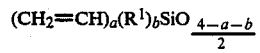

wherein $R^1$ represents a substituted or unsubstituted monovalent hydrocarbon group except for a vinyl group; $0 < a \leq 1$; $0 < b \leq 2$; and $1 < a+b < 3$, (B) from 0.1 to 10 parts by weight of an aromatic ketone photo reaction initiator, and (C) from 0.1 to 5 parts by weight of a trialkenyl isocyanurate or a derivative thereof.

2. A photocurable adhesive composition for glass as claimed in claim 1, wherein said polyorganosiloxane has a viscosity of from 100 to 100,000 cP at 25° C.

3. A photocurable adhesive composition for glass as claimed in claim 1, wherein said polyorganosiloxane has a viscosity of from 200 to 50,000 cP at 25° C.

4. A photocurable adhesive composition for glass as claimed in claim 1, wherein the groups represented by $R^1$ in the polyorganosiloxane comprise a methyl group and up to 40% of a phenyl group.

5. A photocurable adhesive composition for glass as claimed in claim 1, wherein the amount of the vinyl group in the polyorganosiloxane is from 1 to 50% based on the total organic group.

6. A photocurable adhesive composition for glass as claimed in claim 1, wherein the sum of a and b in the polyorganosiloxane ranges from 1.98 to 2.02.

7. A photocurable adhesive composition for glass as claimed in claim 1, wherein said aromatic ketone photo reaction initiator is 2-hydroxy-2-methylpropiophenone, 4'-isopropyl-2-hydroxy-2-methylpropiophenone, 2,2-dimethoxyacetophenone, or 2,2-diethoxyacetophenone.

8. A photocurable adhesive composition for glass as claimed in claim 1, wherein said trialkenyl isocyanurate is triallyl isocyanurate.

* * * * *